United States Patent [19]
Dossier

[11] 3,902,333
[45] Sept. 2, 1975

[54] ELASTIC COUPLINGS

[75] Inventor: Michel Dossier, Orgeval, France

[73] Assignee: Agence Nationale de Valorisation de la Recherche (ANVAR), Neuilly-sur-Seine, France

[22] Filed: Oct. 23, 1973

[21] Appl. No.: 408,747

[30] Foreign Application Priority Data
Oct. 25, 1972 France .............. 72.37826
Jan. 2, 1973 France .............. 73.00046
July 11, 1973 France .............. 73.25496

[52] U.S. Cl. .............. 64/14; 64/13; 64/27 NM
[51] Int. Cl. .............. F16d 3/64
[58] Field of Search .......... 64/14, 13, 11 R, 27 NM, 64/27 R, 6; 267/21

[56] References Cited
UNITED STATES PATENTS

| | | | |
|---|---|---|---|
| 2,337,287 | 12/1943 | Williams | 64/14 |
| 3,238,742 | 3/1966 | Martorana | 64/11 R |
| 3,636,729 | 1/1972 | Patel | 64/14 |

FOREIGN PATENTS OR APPLICATIONS

| | | | |
|---|---|---|---|
| 1,031,617 | 6/1966 | United Kingdom | 64/14 |
| 1,244,747 | 9/1971 | United Kingdom | 64/14 |
| 1,284,057 | 8/1972 | United Kingdom | 64/14 |
| 1,033,971 | 7/1958 | Germany | 64/13 |
| 557,703 | 5/1943 | United Kingdom | 64/14 |
| 1,191,744 | 8/1967 | United Kingdom | 64/11 |
| 1,211,038 | 2/1959 | Germany | 64/13 |

*Primary Examiner*—Samuel Scott
*Assistant Examiner*—Randall Heald
*Attorney, Agent, or Firm*—Larson, Taylor & Hinds

[57] ABSTRACT

The elastic coupling connects a first and second body movable in rotation around substantially aligned axes, and comprises a crown including a number of elastic elements substantially identical and separated by rigid studs for connection with said bodies. Two adjacent elastic elements are connected by adhesion to the stud which separates them and two successive studs are connected in rigid manner, one to the first body and the other to the second body, these studs thus forming a first and second assembly adapted to be associated, respectively, with the first and with the second body. Precompression of the elastic elements is effected at rest, by means being adapted to exert a stress of substantially radial direction on said rigid studs. The precompression means comprise a first and a second rigid element fixed respectively to the first and to the second movable body, each of this first and this second rigid element comprising, stressing means adapted to maintain said radial stress on, respectively, the studs of the first and of the second assemblies. These stressing means are also arranged to maintain the rigid elements fast to the crown without connection of these elements and of the studs to said movable bodies, and not to exert stress, respectively, on the studs of the second and of the first assemblies.

16 Claims, 9 Drawing Figures

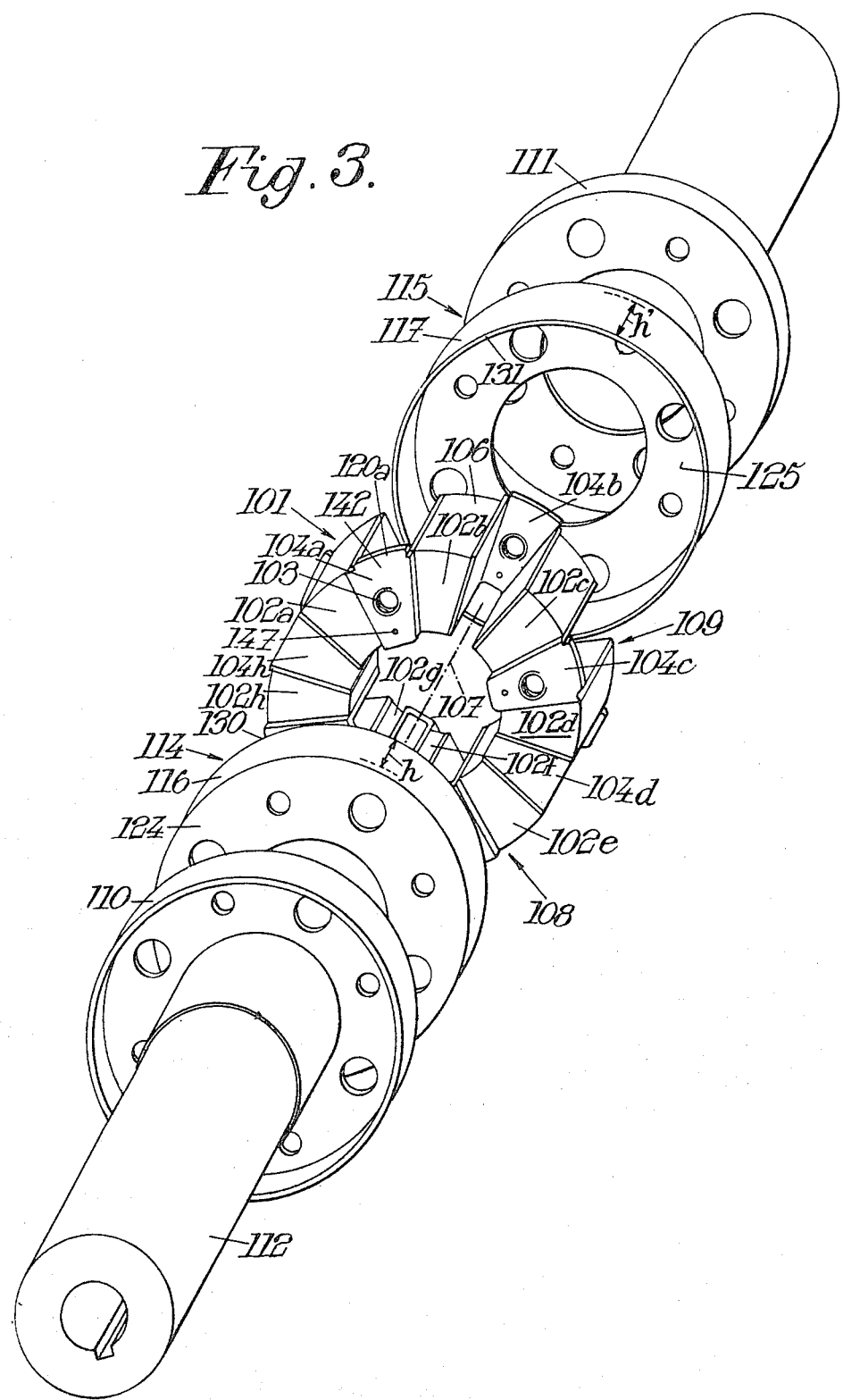

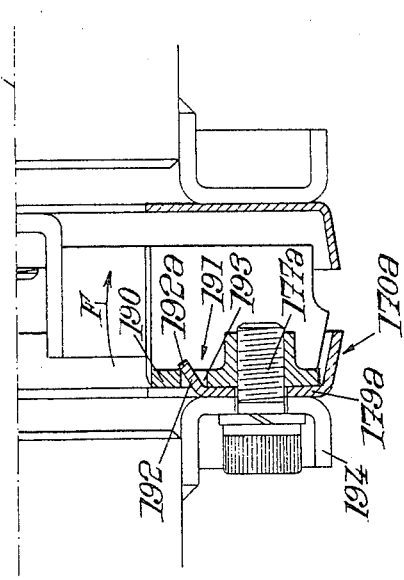
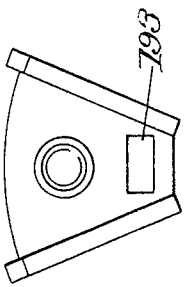

ELASTIC COUPLINGS

The invention relates to improvements in or to elastic couplings adapted to connect a first and a second body movable in rotation around substantially aligned axes.

By "elastic coupling" is meant a coupling for two bodies capable of being placed in rotation around substantially aligned axes and such that the driving of one of these bodies by the other can be effected with a certain torsional elasticity, this coupling compensating, in addition, for possible axial displacements, radial or angular, of the axes of rotation of each of the said coupled bodies.

The invention relates more particularly to elastic couplings of the type concerned which comprise a crown formed from a number of substantially identical elastic elements and separated from one another by rigid members, sometimes hereinafter referred to as studs, for connection with said movable bodies, two adjacent, elastic elements being connected by adhesion to the rigid member or stud which separates them and two successive studs of the crown being adapted to be connected in rigid manner, one with the first body and, the other with the second body, these studs thus forming a first and second assembly adapted to be associated, respectively with the first and with the second body, said elastic coupling comprising, in addition, means for precompression of the elastic elements at rest, these precompression means being adapted to exert a stress in a substantially radial direction on said rigid studs.

Said precompression means of the elastic elements at rest have the purpose of avoiding half of these elastic elements undergoing a tractive force (detrimental to the adhesion of said elements to the studs) when the elastic coupling must transmit a torque.

There are already known (French Pat. No. 1,252,458) elastic couplings of the type concerned in which precompression means of the elastic elements at rest are constituted by a band or "hoop" which encircles the outer cylindrical surface of the crown, this band being removed after each of the studs has been fixed to the corresponding movable body. Such precompression means are difficult to put into practice.

There is also known (French Pat. No. 2,102,496) an elastic coupling in which the precompression means are constituted by a drum, this coupling comprising three studs associated with the same shaft as the drum. For the connection to the other shaft, in this known coupling, there are provided studs which form a rigid armature. It is observed that this coupling does not have, to a sufficient extent, the qualities of flexibility which are generally necessary to produce an elastic coupling.

It is an object of the invention to overcome the above-mentioned drawbacks and, in particular, to provide precompression means for elastic coupling of the type concerned which are simple and easy to put into practice.

It is therefore also an object of the invention to enable the production of an elastic coupling of the abovesaid type in which the crown and the precompression means constitute an assembly having the form of a compact unit.

The elastic coupling according to the invention is generally characterized in that the precompression means comprise a first element for exerting a stress of substantially radial direction exclusively on the rigid members or studs of the first assembly, and a second element for exerting a stress of substantially radial direction exclusively on the rigid members or studs of the second assembly, the first and the second elements being adapted to be fixed, respectively, to the first and to the second movable body.

It will be noted now that such production of precompression means enables, besides tangential and axial play, radial play and angular play (or conical) of the axes of rotation of the movable bodies with respect to one another.

In a first embodiment of the invention the stressing means comprise an axial wall arranged to cover the outer tangential wall of the respective studs, each axial wall forming an integral part of the corresponding rigid element.

In a second embodiment of the elastic coupling according to the invention each rigid element comprises a transverse wall, perpendicular to the axis of the movable body with which it must be associated, and each of the stressing means includes connecting means of one transverse surface of each stud with the transverse wall of the corresponding rigid element.

Other objects, features and characteristics of the invention will appear also in the course of the more detailed description of preferred embodiments of the invention which follows and in which reference is made to the accompanying drawings, but which are of course not to be regarded as limiting.

FIG. 3 shows, in perspective, before their assembly, each of the members of another embodiment of an elastic coupling according to the invention.

FIG. 4 shows, in perspective, an embodiment of a stud according to the invention.

FIG. 8 illustrates again another embodiment of an elastic coupling according to the invention, and FIG. 9 shows a stud of the embodiment shown in FIG. 8.

In these drawings the embodiments of the invention which are shown in FIGS. 1 to 7 relate to the case where the stressing means are constituted by axial walls forming an integral part of the rigid elements. These rigid elements thus form box elements. The embodiment of the invention which is illustrated in FIGS. 8 and 9 relates to the case where the stressing means comprise fixing means of the transverse walls of the studs to the transverse walls of the rigid elements.

Figure 1:
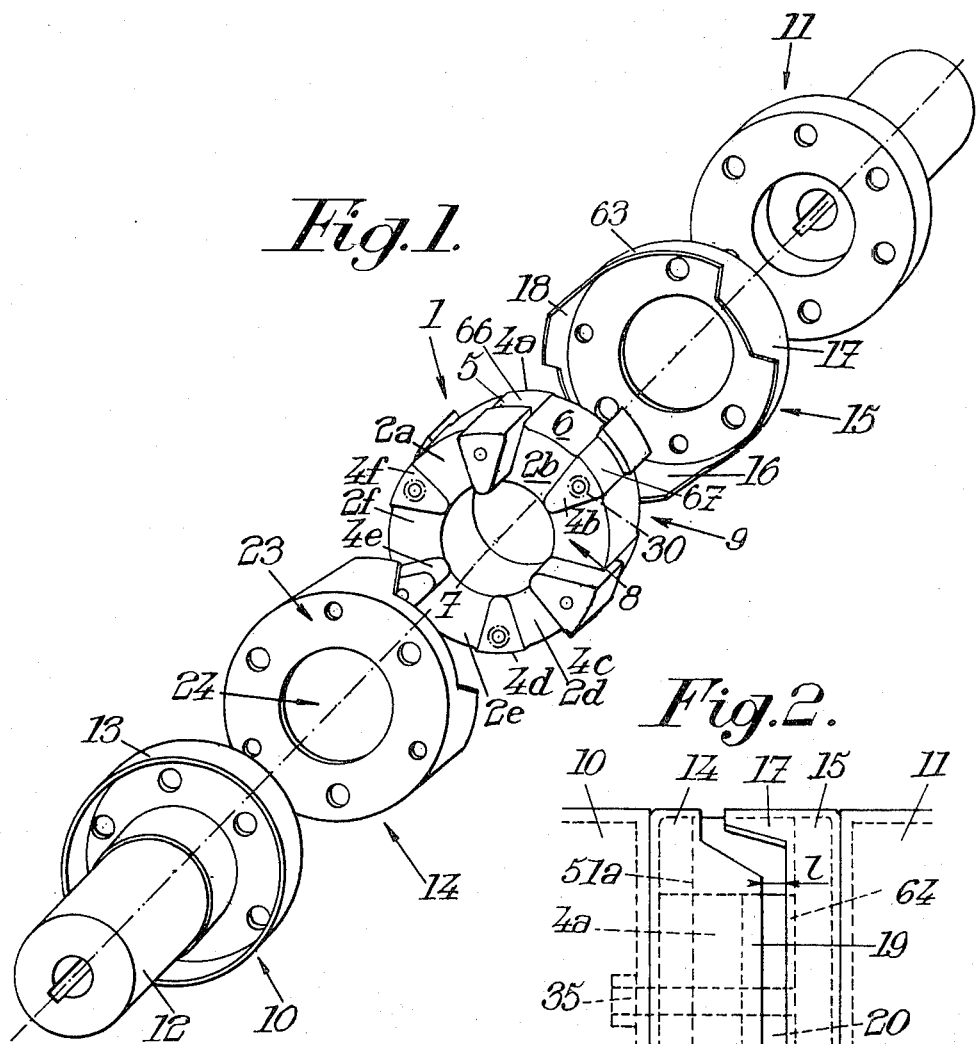
FIG. 1 shows, in perspective, before their assembly, each of the members of a first embodiment of an elastic coupling according to the invention.

The elastic coupling shown in FIG. 1 comprises a crown 1 which constitutes its active portion. This crown 1 has, in fact, the purpose, on one hand, of compensating for possible axial, radial or angular relative displacements of the axes of the bodies to be coupled and, on the other hand, of transmitting torque, from the first to the second body (or vice versa) with a certain torsional elasticity.

This crown 1 is composed, in the example, of six elastic elements identical between themselves 2a, 2b, 2c, 2d, 2e, 2f, each of these elastic elements having a rectangular cross-section. Two adjacent elastic elements such as the elements 2a and 2b are separated by a rigid stud 4a, preferably metallic. The number of studs 4a, 4b, 4c, 4d, 4e, 4f is thus equal to the number (six) of elastic elements. These elastic elements and these studs form a crown 1 all in one block due to the adhesion of the elastic elements to the studs. This crown 1 is, generally, formed by molding, the metallic studs being previously arranged in a mold and the adhesion of these elastic elements (constituted, for example, of an elastomer) to these studs being achieved in the course of molding.

The external tangential surfaces 5 of the studs 4 are in register, in this embodiment, with a cylindrical surface whose diameter is greater than that of the cylindrical surface formed by the outer tangential surfaces 6 of the elastic elements. Moreover, the lateral surfaces 8 and 9, that is to say the surfaces perpendicular to the axis of revolution 7 of this crown, are substantially flat. The studs 4a, 4c and 4e project (parallel to the axis 7) by a same length from the surface 8, whilst the others 4b, 4d and 4f, project from the surface 9. In other words, for two neighbouring studs, one projects from the surface 8 and the other from the opposite surface 9.

There is also shown in FIG. 1 the bushings 10 and 11 which must connect, respectively, the first and the second movable bodies (not shown) to the elastic coupling. For convenience of representation, all the separate members shown in FIG. 1 have the same axis 7. These bushings comprise, in manner known in itself, a cylindrical body 12 and a flange 13 or plate.

In this example, each of the studs is pierced by a tapped hole 30 with an axis parallel to the axis 7, these holes 30 being intended to receive screws for assembly with the bushings 10 and 11. Each bushing flange is in fact pierced by at least three holes which, after mounting, of the elastic coupling, must have the same axis as the three tapped holes of the studs intended to be fixed to this bushing.

In order that the elastic coupling may be usable at high speeds and to transmit non-negligible torques, it is necessary for the elastic elements not to be urged in traction in the course of rotation. For this reason, means for precompression at rest of the elastic elements are provided; these means reduce the outer diameter of the crown 1 and hold this outer diameter to this reduced value.

These precompression means are, according to the invention constituted, in this example, by two box elements 14 and 15 each comprising an axial wall which, in this example, is cylindrical and of outer tangential diameter formed by the studs (before precompression). There is formed in each of these cylindrical walls, three teeth (16, 17 and 18 for the element 15) each intended to cover the outer surface 5 of the stud (respectively 4d, 4b and 4f). Three teeth of the element 14 are intended to cover the outer surfaces 5 of the other studs, namely the studs 4a, 4c and 4e.

The assembly of the studs of the crown 1 to the inside of the box elements 14 and 15 is effected, of course, necessarily by means of a suitable tooling.

Figure 2:
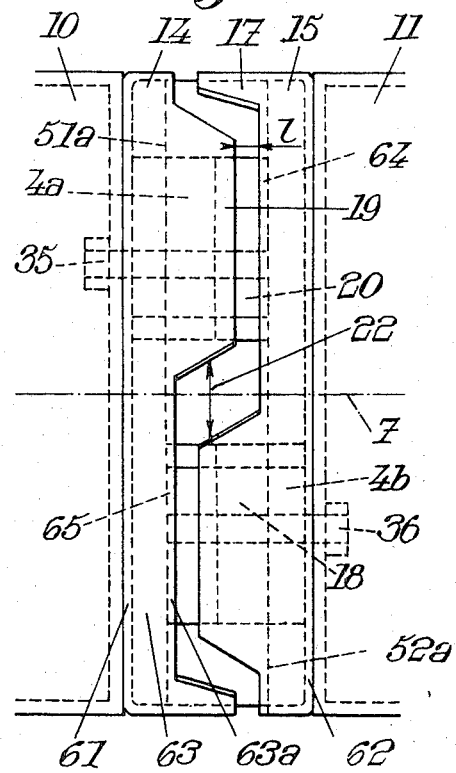
FIG. 2 illustrates, in side view, the crown and the precompression means of the coupling shown in FIG. 1.

As can be seen in FIG. 2, after the positioning of the elastic crown inside the box elements, the tooth 19 of the box element 14 occurs in the middle of the gap 20 which separates the two teeth 17 and 18 of the element 15. The relative dimensions of the tooth 19 and of the gap 20 are such that there exists an axial play 1 and tangential plays 22 between the tooth and the boundaries of the gap. These plays in axial direction and in tangential direction are indispensible in order that the elastic coupling may play its role, that is to say, on one hand, transmit torques with torsional elasticity and, on the other hand, compensate relative displacements of the axes in axial radial and angular direction. All the teeth having the same dimensions and all the gaps separating the teeth having also the same dimensions, the tangential and axial plays exist for each tooth-gap pair. The production of these precompression means enables in fact, as has already been mentioned, the tangential, axial, radial and angular plays of the axes of the bodies to be coupled.

Each box element has one transverse surface perpendicular to the axis 7. These transverse surfaces (23 for the element 14) advantageously comprise a central circular opening (24 for the element 14) of diameter substantially equal to that of the central circular opening 25 of the crown 1. It will be noted here that the latter arrangement enables a shaft (not shown) to be passed through the central portion of the elastic coupling; this shaft can have a large diameter.

For the assembly of the elastic coupling with the bushing 10, as has already been indicated, there are provided three screws which pass through suitable holes provided in the flange 13 and in the transverse surface 23 of the element 14. These screws are introduced into the tapped holes 4a, 4c and 4e. In the same way, three other screws are also provided to assemble the bushing 11 and the element 15 to the three studs 4b, 4d and 4f, three corresponding holes being formed in the lateral surface of the element 15.

There is shown (in interrupted line) in FIG. 2, a screw 35 for assembly to the bushing 10 and a screw 36 for assembly to the bushing 11.

In a modification, the assembly screws are only introduced from one side, for example from the side of the bushing 10. This is particularly advantageous when one of the bushings, for example the bushing 11, is replaced by a part (not shown), for example a flywheel, which has tapped holes for assembly to the coupling according to the invention. In this case, the studs 4b, 4d and 4f are pierced, in the direction of the axis 7, by holes which start from the side of the surface 8, with chamfers, that is to say portions having a diameter greater than that of the corresponding hole. Of course, corresponding holes are provided in the flange 13 and in the surface 23 of the element 14 for the passage of the screw heads. Said chamfers constitute housings for the screw heads which are introduced through the holes of the three studs 4b, 4d and 4f and which must be screwed into the parts to be coupled which has tapped holes.

It will be noted that, at the level of the gaps, the cylindrical wall of the box element has, in an axial direction, a certain height representing a large fraction of the height of each tooth. This portion of the wall 50 enables reinforcement (for rigidity) of the box elements especially when precompression has a considerable value.

Moreover, the height of the reinforcement wall 63 is such that its free edge 63a occurs at the same level, in the axial direction, as the free end 65 of the stud 4b. By "free end" of a stud is meant the transverse surface of this stud which does not project from the transverse wall of the crown 1. Such a free end is not intended to be applied against a transverse wall of the box element).

In addition, in order that said elastic coupling may enable a radial play and an angular play it is necessary that the free edge 63a should not be in contact with the outer tangential surface of the free end 65 of the stud which occurs at the same level. To this end, said outer tangential surface of the free end of each stud has a reduced diameter with respect to that of the rest of the outer tangential surface of the same stud. In other words, the outer tangential surface of the free end of each stud has an inset or discontinuity, 66 (for the stud 4a, FIG. 1) and 67 (for the stud 4b) respectively. In the example, these discontinuities terminate, in an axial direction, at the same level when the elastic coupling is in its resting position.

The elastic coupling shown in FIGS. 1 and 2 is particularly advantageous for transmitting high torque by reason, especially, of the non-negligible height of the reinforcing walls of the box elements.

There will now be described with relation to FIGS. 3 and 4 another embodiment of the invention in which the axial wall of each box element is not cut into teeth and in which the studs occur in the form of substantially U-shaped profiles.

The elastic coupling shown, before its assembly, in FIG. 3, comprises a crown 101 composed, in the example, of eight elastic elements identical between themselves 102a, 102b, 102c, 102d, 102e, 102f, 102g and 102h. The adjacent elastic elements, such as 102a and 102b, are separated by a rigid stud 104a, preferably metallic.

The transverse surfaces 108 and 109, perpendicular to the axis of revolution 107, of the crown 101, are substantially flat and the studs 104a, 104c and 104e and 104g project (parallel to the axis 107) by the same height from the surface 108 whilst the other studs 104b, 104d, 104f and 104h project, preferably by the said same height, from the surface 109. Thus for two neighbouring studs, one projects from the surface 108 and the other from the opposite surface 109. Each of the studs comprises a tapping 103 parallel to the axis 107, these tappings 103 being intended to receive screws for assembly to the bushings 110 and 111.

Additionally, each stud comprises a projection 120 of radial direction which extends beyond the outer tangential surface 106 (cylindrical) of the studs and elastic elements.

Moreover, the sum of the internal heights $h$ and $h'$, in the axial direction, of the substantially cylindrical walls 116 and 117 of the box elements, 114 and 115 respectively, is substantially less than the total height of the crown 101; this total height is equal to the distance which separates the surfaces 108 and 109 increased by the height of the axial projections formed by the studs on each side of these surfaces. In this way, when the crown 101 is mounted inside elements 114 and 115 so that the axial projections of the studs 104b, 104d, 104f and 104h are in contact against the inner surface of the transverse surface 125 of the element 115 and in the same way, the projections of axial direction of the studs 104a, 104c, 104e and 104g are in contact against the inner surface of the transverse surface 124 of the element 114, a certain distance separates the facing edges, respectively 130 and 131, of the walls 116 and 117. This arrangement enables, in particular, the obtaining of axial play and conical play.

In order that, on one hand, only half of the studs may be introducable by force inside the element 114 — so as to render this element rigid — and, on the other hand, only the other half of these studs may be in the same way introducable by force inside the element 115, the abovesaid radial projections 120 will be arranged in such a way that the projections 120a, 120c, 120e and 120g of the studs 104a, 104c, 104e and 104g respectively can only be covered by the inner surface of the cylindrical wall 116 and not by the inner surface of the cylindrical wall 117 of the element 115. In the same way the projections 120b, 120d, 120f and 120h are arranged in such a way that they can only be covered by the wall 117 and not by the wall 116.

In the embodiments of the invention which are shown in FIGS. 3 and 4, each stud has substantially the shape of a U-shape folded sheet metal comprising two lateral wings 140 and 141 to which the adjacent elastic elements are connected by adhesion; the base or surface 142 of this U-shaped sheet metal comprises the projection in axial direction of said stud 104. Advantageously, the wings 140 and 141 form dihedral angle of which the theoretical apex occurs on the axis 107 of the crown 101.

In the embodiments of the invention shown in full line on FIGS. 3 and 4, the outer surface of the elastic elements 102 which are connected by adhesion to the wings 140 and 141, occur at the same level as the outer crests 143 and 144 of these wings, 140 and 141 respectively. In this case the projections 120 is constituted by an extension outwardly — in radial direction — from the surface 142.

As already mentioned for the example shown in FIG. 3, tapped holes 103 are provided in the surface 142 for connection with the bushings 110 or 111. In the example illustrated in FIG. 4, the surface 142 is pierced by a non-tapped hole 145 and a nut, of the same centre as this hole, is welded on this surface 142, inside the U-shaped profile.

To prevent the studs from being tiltable in a position in which the surface 142 is not perpendicular to the axis 107, when the crown is installed inside the box element with which said stud is associated, there are provided assembly means or supplementary connecting means. These supplementary connecting means associate, for example, the surface 142 of the stud 104 with the transverse wall 123 or 124 of the box element 114 or 115 against which said surface 142 must be in contact. In the example illustrated in FIGS. 3 and 4, there is provided a hole 147 in the surface 142. This hole 147 may be utilised for riveting or screwing the surface 142 to said wall 124 or 125. Said surface 142 may also be welded to the associated lateral wall 124 or 125. Lastly there may be provided a tongue on the lateral wall 124 (or 125) which, on assembly, is folded back against the surface 142 of the stud 104. Other assembly means will be described below with relation to FIGS. 8 and 9.

There is shown in FIG. 4, in mixed lines, a modification of the embodiment of a stud 104. In this modification, a fraction of the length of the outer crests 143 and 144 of the wings 140 and 141 is substantially at the same level as the outer crest of the surface 142.

Although in the Figures the studs have the shape of open profiles in a radial direction, there could however be provided surfaces which close these openings in order, especially, to improve the rigidity of the studs. In the embodiment of FIGS. 3 and 4 the studs could also be produced in a compact manner. In this case, it is necessary to provide of course, radial projections 120 which extend over a fraction of the height, in an axial direction of the crown 101.

There will now be described with relation to FIGS. 5 to 7 another feature of the invention which enables a particularly easy assembly of the crown — composed of studs and elastic elements — inside box elements. This feature can be used in combination with all the embodiments already described (the axial wall of each box element is solid or cut-out into teeth).

Figure 5:
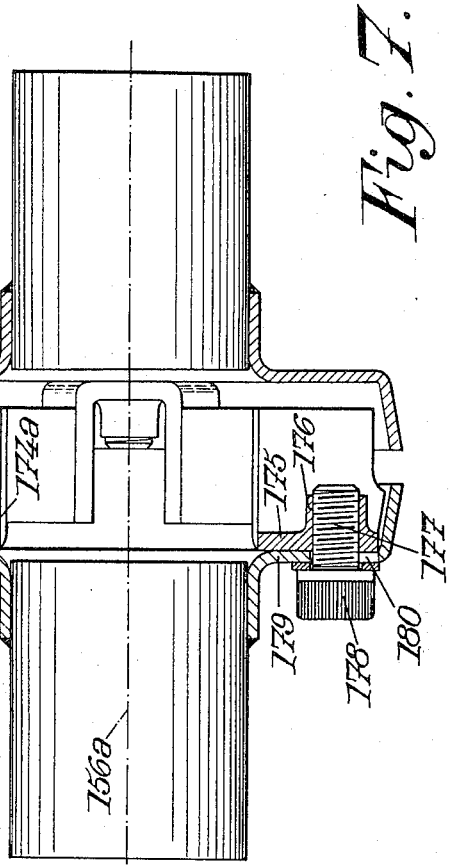
FIG. 5 shows an elastic coupling according to the invention in which the axial wall of each rigid element, forming a box element, has a frustoconic shape.

In the embodiment of the invention which is shown in FIG. 5, each box element 170, 171, comprises an outer wall, 172 and 173 respectively, which has a frustoconic shape. By "outer wall" of each box element is meant that of the walls of each box element which is intended to envelope the outer tangential surface of the elastic crown. The trunks of cones formed by the walls 172 and 173 have substantially the same axis 156a as the rotary bodies between which the elastic coupling according to the invention is arranged.

Moreover, it is important to note, that the largest diameter of said trunks of a cone is that which occurs at the free end, in the axial direction, of said walls 172 and 173.

The studs 174, 175 of the crown which is intended to be introduced inside said box elements, to undergo precompression at rest, have of course, an outer tangential surface of a shape such that they can be introduced inside said box elements. It must be noted, however, that this outer tangential surface is not necessarily frustoconic. Said outer tangential surface of each stud can, for example, be frustoconic only over a small portion of its length (in the axial direction).

Figure 7:
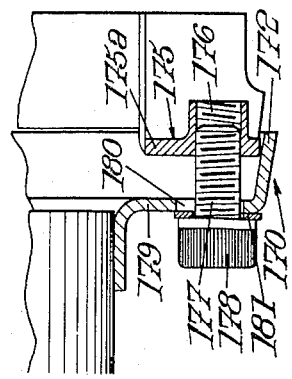
FIG. 7 shows, in portion, the elastic coupling shown in FIG. 5, before the assembly of the crown to the inside of the box elements.

In the example shown in FIGS. 5 and 7 each stud has substantially the shape of a U-shaped profile. The lateral branches of said U-shaped profile have outer edges, constituting said outer tangential surface, which are arranged in the following manner: from the surface 174a the outer crest 174b of each lateral branch has an inclination which corresponds to that of the outer wall 172 of the box element 170; towards the free end of the stud of said outer crests 174b lateral branches occur on a cylindrical surface (fictive) whose diameter is less than the smallest diameter of the inner surface of the wall 173. In this way the outer tangential surface of each stud has a cut-out so that, at rest, the inner surface of the wall 173 is not in contact with the stud which is not associated with it.

The feature which has just been described and according to which the walls 172 and 173 of the box element 170 and 171 have a frustoconic shape enables, in cooperation with other features which will now be described below, the introduction of the crown — composed of studs and elastic elements — inside box elements without it being necessary to resort to a particular tooling for this operation.

To this end, each stud has a threading 176 (a stud 175) with axis parallel to the axis 156a. These tappings 176 are intended to cooperate with screws 177 having a head 178. In addition, opposite said tappings 176 the transverse wall 179 of the corresponding box element 170 is pierced by an opening 180 of elongated shape in the radial direction. In the example the head 178 of the screw 177 rests on the edges of the opening 180 by means of a washer 181.

Figure 6:
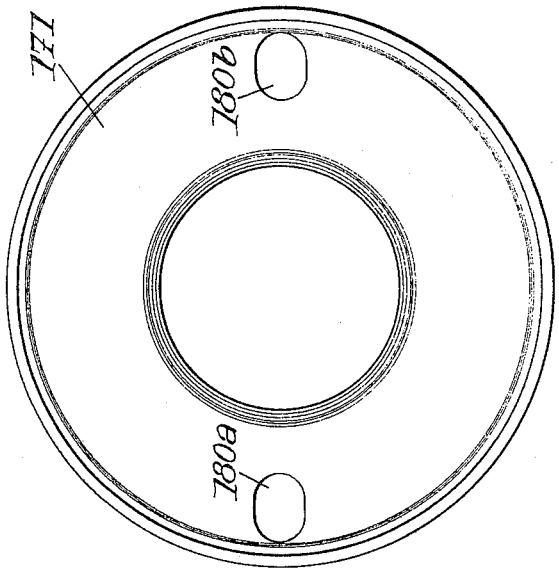
FIG. 6 shows a box element of the embodiment shown in FIG. 5.

There is shown in FIG. 6 a view from the side of the casing 171; in this FIG. 6 the elongated shape of the openings 180a and 180b appear clearly.

The role of the screws, of the tappings and of the elongated openings 180 will be explained with relation to FIG. 7. There is shown in this FIG. 7 the position of the stud 175 at the beginning of the assembly of this stud inside the box element 170 (whilst the FIG. 5 shows the elastic coupling at the end of said assembly).

At the beginning of the assembly operation of the stud 175 to the box element 170 the tapping 176 is arranged opposite the outermost portion (in the radial direction) of the opening 180. When the head 178 of the screw 177 is made to rotate so as to introduce this screw inside the tapping 176, the wall 175a of the stud 175 approaches the inner surface of the transverse wall 179 of said box element 170 and, through this fact, the crown undergoes precompression since the inner diameter of the wall 172 of the element 170 diminishes towards the inside. It is to be noted that in the course of this screwing operation, the screw 177 is moved in a radial direction in order to approach the more innermost portion (in radial direction) of the opening 180.

In the example shown the crown comprises four studs and the box elements are welded by means of a cylindrical portion, to rotary bodies between which is interposed the elastic coupling. In other words, in this example, each box element constitutes the coupling bushing.

FIGS. 8 and 9 illustrate another feature of the invention.

This feature relates to another embodiment of stressing means. The latter are not produced in the form of an axial wall which surrounds the outer tangential surface of the elastic crown. In the example shown there has however been provided an axial wall 170a but the latter has not the function of exerting a radial stress; this wall 170a constitutes, for example, a protective cap.

Said stress is produced by means of fixing or connecting the end wall 190 of a stud (which wall projects from the transverse wall of the crown) to the transverse wall 179a of a rigid element 170a. In the example shown, these connecting means enable precompression before fixing by screws 177a (shown in fine lines in FIG. 8) and complementary tapping in the corresponding stud 191. Preferably this fixing is closer to the axis 156b of the rotary body than the fixing by means of the screw 177a.

In the example each stud has the shape of a U-shaped profile and the transverse wall 179a of each rigid element comprises projections 192 of oblique direction. These projections 192 are adapted to cooperate with corresponding openings 193 provided in the end walls 190 of the studs 191. In the preferred embodiment of the invention the projections 192 are produced by cutting out the corresponding transverse wall 179a, the portion of the wall cut out being then forced back inside the box element 170a to form the oblique projection 191, the angle formed between the projection and the solid wall being obtuse.

The opening 193 of the stud shown in FIG. 9 has the rectangular shape.

To introduce the projections 192 inside the openings 193 the crown comprising the elastic elements is made to undergo a precompression greater than the precompression at rest by means of a suitable tooling. After this operation, the wall 190 of the stud 191 being installed against the inner surface of the wall 179a, the free end 192a of the projection 192 covers the inner edge, in a radial direction, of the opening 193.

It will be noted that said fixing could be effected in a different manner, for example by riveting.

In the example shown in FIG. 8, each rigid precompression element is connected to the corresponding rotary body by an intermediate part 194 (shown in fine lines in FIG. 8) welded to the rotary body. This feature enables the installation or removal of the elastic coupling by screwing or unscrewing the screws 177a (and radial sliding) without having to displace said rotary bodies.

A particularly important advantage of the couplings which have just been described with relation to FIGS. 1 to 9 (except however, in the case of FIGS. 5 and 7) is that, when the crown is rendered fast to its two rigid elements of precompression, there is obtained a unit in a single piece without its being necessary to add connecting screws between said rigid elements and studs. This unit in a single piece is easily transportable for example for distribution in the trade. In addition (as has just been seen with relation to FIG. 8) these units in a compact block, composed of the crown and its precompression means, can easily be placed in position or withdrawn by radial sliding without having to displace the body to be coupled. This is particularly useful when the shafts to be coupled in relation form part of machines which are difficult to displace.

Another advantage, lastly, of the elastic coupling according to the invention resides in the fact that the two rigid elements constitute, besides precompression means installed on sight, a protective cap against possible rupture of the crown. In fact, if the crown has deteriorated, a stud or an elastic element could, in the absence of a protected cap, be ejected with force by reason of the centrifugal force, which would constitute a considerable danger.

The invention is applicable to numerous cases. Generally it can be used each time that it is necessary to couple in rotation two bodies movable in rotation of which the axes can undergo displacements with respect to one another.

Of course, the description which has just been made of the specific embodiments and types of application of the invention are not of course to be considered as limiting in scope. The invention encompasses, on the other hand, all modifications conceivable by the technician skilled in the art.

I claim:

1. Elastic coupling adapted to connect first and second bodies movable in rotation around substantially aligned axes, the elastic coupling comprising a crown including a number of substantially identical elastic elements separated by rigid members for connection with said bodies, adjacent elastic elements being connected by adhesion to the rigid manner which separates them and successive rigid members being adapted to be connected, in rigid manner, one to the first body and the other to the second body, said rigid members thus forming a first and a second assembly constructed and arranged to be associated, respectively, with the first and with the second body, and means for precompression of the elastic elements at rest, said precompression means comprising a first element including a first axial wall for exerting a stress of substantially radial direction exclusively on the rigid members of the first assembly, and a second element including a second axial wall for exerting a stress of substantially radial direction exclusively on the rigid members of the second assembly, the first and the second element being adapted to be fixed, respectively, to the first and to the second movable body, said first axial wall covering the outer tangential walls of the rigid members of the first assembly, and the second axial wall covering the outer tangential walls of the rigid members of the second assembly.

2. Elastic coupling according to claim 1 wherein each of said first and second elements comprises a transverse wall perpendicular to the axis of the movable body with which it is associated, and means for connecting a transverse surface of each rigid member with the transverse wall of the corresponding element.

3. Elastic coupling according to claim 2, wherein each rigid member has a U-shaped profile whose base constitutes a transverse surface of the elastic crown and wherein said connecting means include, on one hand, on the transverse wall of each element of the precompression means, oblique axial projections, equal in number at least to half the number of rigid members and, on the other hand, on said base of each rigid member, openings adapted to receive said oblique projections, the position and dimensions of the oblique projections being such that they can retain said rigid members and be introduced inside openings of the rigid members when the crown undergoes a greater precompression than the precompression at rest.

4. Elastic coupling according to claim 1 wherein each of the rigid members comprises a projection of radial direction, the projections of radial direction of the rigid members of the first assembly being arranged so as to be in contact exclusively with said first axial wall of the first rigid element, when the latter is installed around said crown, and the projections of radial direction of the rigid members of the second assembly being arranged so as to be in contact exclusively with said second axial wall of the second element when the latter is installed around the crown.

5. Elastic coupling according to claim 1 wherein the sum of the internal heights, in an axial direction, of said first and second axial walls is substantially less than the total height, in the axial direction, of said crown.

6. Elastic coupling according to claim 5, wherein said internal heights, in an axial direction, of the first and second axial walls are equal.

7. Elastic coupling according to claim 4 wherein each rigid member is formed in the shape of a metal sheet folded into a U with two lateral wings with which the elastic elements are connected by adhesion, the central surface of this U folded sheet being extended radially to form said projection of radial direction, this central surface forming, in addition, a projection, in the axial direction, of said crown.

8. Elastic coupling according to claim 1 wherein said axial walls have a substantially frustoconic shape having substantially the same axis as that of the body movable in rotation with which the corresponding element of the precompression means is associated, the largest diameters of these frustoconic walls being facing each other, these largest diameters being greater than the smallest diameter of the outer tangential walls of said rigid members, and the sum of the internal heights, in the axial direction, of said axial walls being substantially constant and less than the total height, in the axial direction, of said crown at rest.

9. Elastic coupling according to claim 8 wherein each rigid member of the crown includes a tapping with an axis substantially parallel with that of the movable body with which it is associated, each element of the precompression means comprising a transverse wall, perpendicular to the axis of the body movable in rotation, having openings elongated in a radial direction, and arranged opposite said tappings of the rigid members, the number of openings being at least equal to half the number of rigid members, the precompression means including screws with a head and arranged to cooperate with said tappings and openings so that the base of each screw head can be supported on the edges of an opening and approach the axis of the crown on screwing said screws in the corresponding tappings.

10. Elastic coupling according to claim 1 wherein each axial wall is substantially cylindrical and of diameter substantially less than that of the outer surface of the crown when the elastic elements of the crown have not undergone precompression, teeth, equal in number to half the number of elastic elements, being cut out, at regular intervals, in each of said axial walls, each of these teeth having dimensions such that they can cover, at least in part, the outer tangential wall of a rigid member, said dimensions of each tooth and those of the gap which separates two consecutive teeth of a same axial wall being such that, when the crown is inside the two axial walls, each tooth of the first axial wall is arranged in the gap separating two consecutive teeth of the second axial wall and vice-versa.

11. Elastic coupling according to claim 10 wherein the base of the gap separating two teeth of a same axial wall comprises a reinforcing wall whose height, in an axial direction, represents a large fraction of the height of each tooth, this reinforcing wall being adapted to occur at the same level, in an axial direction, as the free end of a rigid member associated with the other axial wall, each of the rigid members having, in the vicinity of said free end, an outer tangential wall of diameter less than that of its outer tangential wall in the region of its other end, this portion of less diameter of each rigid member extending over a length, in an axial direction, which is greater than the distance separating, at rest, the top of the tooth of one axial wall from the base of the gap of the other axial wall in which this tooth is inserted.

12. Elastic coupling according to claim 1 wherein said first element of the precompression means is identical to the second element of the precompression means.

13. Elastic coupling according to claim 1 wherein said crown includes a central hole and said first and second elements have corresponding central holes.

14. Elastic coupling adapted to connect a first and a second body movable in rotation around substantially aligned axes, this elastic coupling comprises a crown including a number of substantially identical elastic elements and rigid members separating said elastic elements, said rigid members providing connection with said bodies, adjacent elastic elements being connected by adhesion to the rigid member which separates them, and successive rigid members being adapted to be connected, in rigid manner, one to the first body and the other to the second body, these rigid members thus forming first and second assemblies adapted to be associated, respectively, with the first and with the second bodies, and means for precompression of the elastic elements at rest, said precompression means comprising a first element adapted to exert a stress of substantially radial direction exclusively on the rigid members of the first assembly, and a second element adapted to exert a stress of substantially radial direction exclusively on the rigid members of the second assembly, the first and the second elements being adapted to be fixed, respectively, to the first and to the second movable bodies, each of said elements of the precompression means comprising a transverse wall perpendicular to the axis of the movable body with which it is associated, and means for connecting one transverse surface of each rigid member with the transverse wall of the corresponding element of the precompression means, each rigid member having a U-shaped profile whose base constitutes a transverse surface of the elastic crown, and said connecting means including, on one hand, on the transverse wall of each element of the precompression means, oblique axial projections, equal in number at least to half the number of rigid members, and, on the other hand, on said base of each rigid member, openings adapted to receive said oblique projections, the position and dimensions of the oblique projections being such that they can retain said rigid members and be introduced inside openings of the rigid members when the crown undergoes a greater precompression than the precompression at rest.

15. Elastic coupling according to claim 14 wherein said first element of the precompression means is identical to the second element of the precompression means.

16. Elastic coupling according to claim 14 wherein said crown includes a central hole and said first and second elements have corresponding central holes.

* * * * *

PO-1050
(5/69)

UNITED STATES PATENT OFFICE
CERTIFICATE OF CORRECTION

Patent No. 3,902,333    Dated September 2, 1975

Inventor(s) MICHEL DOSSIER

It is certified that error appears in the above-identified patent and that said Letters Patent are hereby corrected as shown below:

In column 9, line 64, this being the seventh line of Claim 1, "manner" is corrected to read --member--.

Signed and Sealed this twenty-fourth Day of February 1976

[SEAL]

Attest:

RUTH C. MASON
Attesting Officer

C. MARSHALL DANN
Commissioner of Patents and Trademarks